(12) United States Patent
Navez et al.

(10) Patent No.: US 9,920,177 B2
(45) Date of Patent: Mar. 20, 2018

(54) CONTINUOUS METHOD FOR PRODUCING SOLID, HOLLOW OR OPEN PROFILES

(71) Applicant: NMC S.A., Raeren/Eynatten (BE)

(72) Inventors: Vincent Navez, Louvain-la-Neuve (BE); Robert Frere, Plombieres (BE); Jean-Pierre Mayeres, Eupen (BE); Emmanuel Noel, Opprebais (BE)

(73) Assignee: NMC S.A., Raeren/Eynatten (BE)

( * ) Notice: Subject to any disclaimer, the term of this patent is extended or adjusted under 35 U.S.C. 154(b) by 508 days.

(21) Appl. No.: 13/911,491

(22) Filed: Jun. 6, 2013

(65) Prior Publication Data

US 2013/0274359 A1    Oct. 17, 2013

Related U.S. Application Data

(63) Continuation-in-part of application No. 10/558,977, filed as application No. PCT/EP2004/051027 on Jun. 4, 2004, now abandoned.

(51) Int. Cl.
| | |
|---|---|
| *B29C 44/22* | (2006.01) |
| *C08J 9/12* | (2006.01) |
| *B29C 44/34* | (2006.01) |
| *B29C 44/60* | (2006.01) |

(52) U.S. Cl.
CPC ............... *C08J 9/122* (2013.01); *B29C 44/22* (2013.01); *B29C 44/348* (2013.01); *B29C 44/605* (2013.01); *C08J 2201/03* (2013.01); *C08J 2203/06* (2013.01); *C08J 2325/06* (2013.01)

(58) Field of Classification Search
CPC .................................................. B29C 44/348

USPC ................................................... 264/45.9, 50
See application file for complete search history.

(56) References Cited

U.S. PATENT DOCUMENTS

| | | | |
|---|---|---|---|
| 4,198,363 | A | 4/1980 | Noel |
| 5,538,777 | A | 7/1996 | Pauley et al. |
| 5,674,602 | A | 10/1997 | Karabedian et al. |
| 5,753,717 | A | 5/1998 | Sanyasi |
| 6,132,077 | A | 10/2000 | Fogarty |
| 6,294,115 | B1 | 9/2001 | Blizard |
| 6,391,931 | B1 | 5/2002 | Gehlsen et al. |
| 6,544,450 | B2 | 4/2003 | Welsh et al. |
| 6,638,985 | B2 | 10/2003 | Gehlsen et al. |
| 2002/0096797 | A1 | 7/2002 | Stoffelsma et al. |
| 2002/0169224 | A1 | 11/2002 | Gehlsen et al. |

FOREIGN PATENT DOCUMENTS

| | | |
|---|---|---|
| EP | 0807510 A1 | 11/1997 |
| WO | 9706935 | 2/1997 |

OTHER PUBLICATIONS

Glass Transition retrieved from the internet Oct. 22, 2009. http://en.wikipedia.org/wiki/Glass_transition.

(Continued)

*Primary Examiner* — Alison L Hindenlang
(74) *Attorney, Agent, or Firm* — Cantor Colburn LLP

(57) ABSTRACT

Disclosed herein is a method for producing a polystyrene foam. The polystyrene is dosed with a gas and the polystyrene and gas are mixed in an extruder in order to obtain a homogenous mixture. The homogeneous mixture is cooled as it travels through the extruder and is then extruded from the die at a pressure of less than 7 MPa to form a foam with a smooth skin.

12 Claims, 1 Drawing Sheet

(56) References Cited

OTHER PUBLICATIONS

International Search Report of the International Searching Authority, for International Application PCT/EP2004/051027, dated Sep. 23, 2004, 3 pages.
H.G. Elias "Macromolecules 1—Structure and Properties; Chapter 10—Thermal Transitions" (1984) pp. 375-377; Plenum Press New York US/London UK.
Throne, James L. "Thermoplastic Foams", Sherwood Technologies, Inc., Sherwood Publishers, Hinckley, OH, 1996.
Ellis et al., "Polymers: A Property Database" CRC Press, Copyright 2009; pp. 862-871.

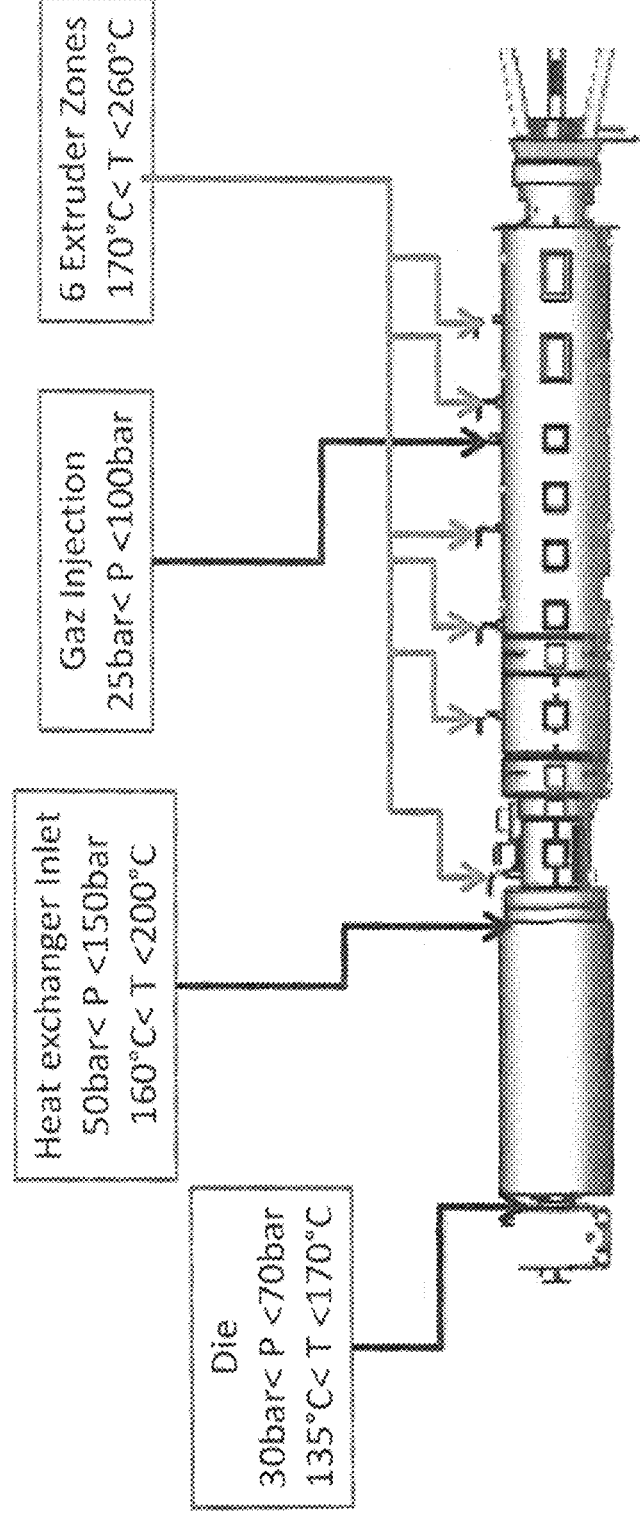

CONTINUOUS METHOD FOR PRODUCING SOLID, HOLLOW OR OPEN PROFILES

CROSS-REFERENCE TO RELATED APPLICATIONS

This reference is a continuation in part of patent application Ser. No. 10/558,977 filed on Nov. 30, 2005, the entire contents of which are hereby incorporated by reference.

TECHNICAL FIELD OF INVENTION

The present invention relates to a method for continuous production of solid, hollow or open profiles, in particular those including sharp edges, by extrusion of thermoplastics, polystyrenes in particular.

BRIEF DISCUSSION OF RELATED ART

Polystyrene profiles with a density larger than 400 kg/m³ have been produced for many years, for use in interior or exterior decoration of dwellings. These profiles with various shapes have a pronounced decorative aspect and are often used for replacing or imitating decorations of stucco ceilings. Further, by their high density, they are able to withstand impacts, which allows their use at the level of circulation of persons and mobile objects which may knock them. As polystyrene does hardly absorb any water, such profiles may be used at ground level, as plinths.

In order to be able to produce profiles with complex decorations of good quality and having an acceptable surface aspect, it is required that the profile have a regular structure, i.e., fine and uniform cells. If the cells are irregular, surface defects are visible and the profiles are not marketable.

In spite of many efforts, it has not been possible to produce such polystyrene profiles with a density less than 400 kg/m³. Indeed, as soon as producing profiles with a density less than this value is attempted, structures are obtained which are not sufficiently regular to obtain profiles which do not have interfering surface defects.

U.S. Pat. No. 5,753,717 describes a method for extruding polystyrene foam by means of $CO_2$, having an improved mechanical strength, obtained by attaining a temperature at the outlet of the die, less than a critical temperature. To successfully cool the polymer+$CO_2$ mixture below this critical temperature, the inventor emphasizes the necessity of jointly injecting a larger proportion of foaming agent. Density is consequently lowered, the gas having a reduction effect on the viscosity by plasticization, which reduces viscous frictions and heat generated by these frictions. The described obtained products are in the form of sheets, intended to be thermoformed, having a particularly fine cell size (<25 µm) and a cell wall thickness from 1 to 2 µm. The density of the foam is less than 4 lbs/ft³ (64 kg/m³].

Moreover, U.S. Pat. No. 5,753,717 emphasizes that it has previously not been possible to obtain polystyrene foams with high densities AND a very fine cell size: by reducing the proportion of swelling agent, density increases but the cells become thick and large. U.S. Pat. No. 5,753,717 further specifies that with the conventional prior method, only sheets of foams with rather large and thick cells may be obtained by working at die temperatures of at least 140° C. and up to 155° C.

US 2002/0169224 describes a continuous method for preparing foams having reduced and/or uniform cell sizes by forming a uniform mixture of polymer and foaming agent, by reducing the temperature of the mixture at the outlet and at a sufficient pressure in order to maintain the foaming agent in the solution and by subsequently having the mixture pass through an outlet port before expanding it. The extrusion temperature is equal to or less than 30° above the glass transition temperature of the polymer and the amount of $CO_2$ used is at least 4.4% by weight of the polymer. The claimed cell sizes are between 2 and 200 µm and the densities between 100 and 300 kg/m³.

BRIEF SUMMARY OF THE INVENTION

The invention proposes a new method for producing profiles comprising polystyrene foam with a density between 200 kg/m³ and 350 kg/m³, with fine cells from 25 to 100 µm and with a homogenous size.

This is achieved by a method for producing solid, hollow or open profiles, in particular those including sharp edges, based on polystyrene, including the following steps:
  dosing polymers comprising polystyrene and optionally other additives and adjuvants
  plasticizing the components in an extruder in order to obtain a homogenous mixture,
  injecting a pressurized gas via an injection port in an amount from 0.2 to 0.4% by weight based on the polymers comprising polystyrene.
  kneading and pressurizing said homogeneous mixture and gas until complete dissolution of the gas in order to obtain a mixture in a single phase,
  gradually cooling said mixture while maintaining the pressure required for solubilizing the gas, up to a temperature above 135° C., giving rise to the intended density and cell size, said temperature preferably being as uniform as possible in a cross-section perpendicular to the flow, in order to minimize differences in temperature between the centre and the perimeter of the polymer and dissolved gas flux,
  having said mixture pass as a single phase mixture, into a die; the mixture expanding into a foam, when outside the die, where the die pressure is greater than or equal to 3 MPa and less than or equal to 7 MPa;
  having the thereby formed foam pass through an optionally temperature-controlled calibration system,
  drawing the calibrated foam with a motor.

Polystyrene-based foams with a density between 200 kg/m³ and 350 kg/m³ while having a smooth surface aspect and without any apparent defects may be produced with this method.

By means of the control, the efficiency and homogeneity of the applied cooling, the method allows an increase in the productivity of profiles and the quality of the cells is well uniform.

Surprisingly, foams with a density between 200 kg/m³ and 350 kg/m³, with fine cells from 25 to 100 µm, and with a homogeneous size, may be obtained by the method developed within the scope of the present invention, even with optimum foaming temperatures above 135° C., preferably above 135° C., preferably above 140° C., preferably above 145° C. and more preferably above 150° C.

In the case of the present invention, given that the aimed densities are much higher than those contemplated in U.S. Pat. No. 5,753,717, the thickness of the cell walls will inevitably be larger. But obtaining sufficiently fine cells in order to provide the foams of the present invention with an adequate surface quality, remains essential, and this seemed difficult or even unfeasible according to U.S. Pat. No. 5,753,717. The analysis of the possible causes of these problems led us to consider not only the cooling power to be applied, the temperature to be attained at the die but also the homogeneity of this temperature in a section perpendicular to the flow. The more it is desired to achieve high densities, the larger is the cooling power to be achieved, but especially the more it is difficult to reduce the difference in temperature between the centre of the flux and the edges. This then results in that the too hot centre of the flow will have a lower viscosity, providing less resistance to expansion of gas bubbles, thereby increasing the average size of the cells of the foam, to the detriment of its aspect and quality.

The optimum temperature at which the foam reaches the most favorable quality (density—cell size) is also crucial, for this the cooling system should be sufficiently powerful, nevertheless gradual and well-controlled.

According to a first advantageous embodiment, the applied polymer is selected from the group consisting of polystyrene, acrylonitrile-butadiene-styrene (ABS), styrene-butadiene-styrene (SBS), styrene-ethylene-butadiene-styrene (SEBS) or mixtures thereof.

Several kinds of polystyrenes which differ in viscosity, and therefore in molecular weight, may also be used alone or mixed with other copolymers of styrene and a diene monomer. Adequate copolymers are for example acrylonitrile-butadiene-styrene (ABS), styrene-butadiene-styrene (SBS), styrene-ethylene-butadiene-styrene (SEBS) or mixtures thereof.

It is also possible to alter a portion or all the surface of the solidified primary foam profile by adding a further layer of material to it by co-extrusion. This co-extruded material may be in the foamed or compact state.

The foaming gas preferably used is $CO_2$.

BRIEF DESCRIPTION OF THE FIGURES

The FIGURE is a depiction of an extruder with the barrel temperatures and pressures.

DETAILED DESCRIPTION OF THE INVENTION

Other particularities and features of the invention will become apparent from the detailed description of a few advantageous embodiments presented hereinbelow, as an illustration.

1. Manufacturing Method 1.1. Dosage of the Components:

The components of the formulation are individually dosed by a volumetric or gravimetric type dosage station, in order to specifically achieve the desired composition. The raw materials preferably are in the form of regular granules, if possible with the same size and the same shape from one component to the other. It will also be preferred that the apparent density be in a narrow range between the different components, in order not to cause premature demixtion.

1.2. Extruder:

The thereby dosed components are conveyed towards the feeder of a plasticizing extruder. This extruder preferably includes two co-rotary or counter-rotary screws, either self-cleaning or not. The screw used involves the use of a "diamond mixer" also known as "pinapple mixer". Indeed, this screw design facilitates homogenization of the polymer with the gas and other additives that are added to the extruder. The cylinder includes several heating zones. An exemplary extruder that includes the heating zones along with the relevant pressures and temperatures is shown in the FIGURE. The range of pressure within the extruder is comprised from 2.5 megaPascals (MPa) to 10 MPa. The range of pressure within the extruder is comprised from 2.5 MPa to 10 MPa, the range of pressure within the heat exchanger inlet is from 5 MPa to 15 MPa and the range of die pressure is from 3 MPa to 7 MPa. The temperature within the extruder zones is from 170° C. to 260° C. in order to plasticize the solid components dosed at the feeder, while kneading them to homogenize the whole. At the most favorable location from the viscosity and pressure point of view, in the cylinder, pressurized gas is injected via an injection port bored into the cylinder. The gas injection occurs within the extruder between barrels two and three. The pressure of the gas at the point of entry is from 2.5 MPa to 10 MPa. The gas will be maintained in its condensed phase, in particular, in the supercritical state in the case of $CO_2$ (see point 2.2). The mixture of the components and the gas is kneaded and pressurized in order to obtain good homogeneity and optimum dissolution of the gas in the molten mixture so as to obtain a single phase. The cylinder zones are then gradually colder in order to maintain the pressure required for solubilizing the gas.

1.3. Cooling:

It may be achieved by two arrangements:

i) A "dynamic" heat exchanger by using a configuration with long screws: as the first portion of the cylinder has been used for plasticizing and homogenizing solid components with the gas as described in the previous point b), the second portion of the screw, the zones of which are cooled by the flow of a coolant fluid, provides the cooling of the monophase mixture. The design of the screw of the latter portion is specifically adapted to generate the least possible heat by shearing, which increases the potential cooling capacity and therefore benefits productivity. The design of the cooling section of the screw will be adapted so as to achieve at the inlet of the die the optimum temperature, with the homogeneity of which in a cross-section perpendicular to the flow, it is possible to obtain the advantageous claimed combination of density and cell size.

ii) A "static" heat exchanger: the homogeneous mixture of the plasticized components+the gas leaves the cylinder of the extruder so as to pass through a heat exchanger, through which a coolant fluid flows, the design of which should provide control over the mixing temperature to within a tenth of a degree, so that the optimum foaming temperature at the die may be obtained with the desired accuracy and graduality. The exchanger should further be designed in order to smooth out the temperature profile in a cross-section perpendicular to the flow, in order to make the temperature profile at the exit of this exchanger, as flat as possible. By adding a static exchanger after the cylinder of the extruder, it is further possible to increase the permissible flow rate.

1.4. Homogenization:

The cooled mixture is optionally again homogenized, by having it pass into a static mixer which will divide the flux into several "channels" which will be crossed and redistributed, in order to make the temperature profile of a perpendicular section of the flux as flat as possible.

1.5. Relaxation:

A section for relaxation of the flux may optionally be added, by placing an empty tube over a suitable distance. This allows the internal stresses due to shearing, as well as visco-elastic "memory" effects to be released and to provide a more regular flow of the flux.

1.6. Foaming Die:

The monophase mixture, homogeneous in composition and in temperature, of the plasticized components and the gas will now pass into the shaping tool, consisting of a die guiding the flux towards the intended foaming shape. The pressure drop undergone by the mixture from the outlet of the cylinder constantly reduces the pressure of the mixture; at one moment, this pressure drops below the critical threshold where the previously solubilized gas will oversaturate the mixture and gas bubbles will then originate, forming a second discrete phase. Ideally, the zone where these primary bubbles form should not be passed too early, otherwise pre-foaming may occur giving a deformed and unstable foam with a not very attractive surface. In one exemplary embodiment, the foaming occurs after the homogeneous mixture has been expelled from the die. In an exemplary embodiment, the die temperature ranges from 150 to 170° C., specifically about 153 to 165° C.

The die pressure ranges from 3 MPa to 7 MPa, specifically 3 MPa to 6 MPa, and more specifically 3 MPa to 5 MPa.

The measures of actions on the location where this critical demixing step occurs, are multiple: viscosity of the components, temperature of the tool, proportion of gas, shape of the tool, throughput of the extruder . . . all these parameters should be optimized for each foam profile to be achieved.

1.7. Shaping:

The foam emerges into the atmosphere, at a high temperature, and freely expands. The viscosity of the cell walls increases with cooling, and migration of the gas into the cells, until the cell structure is set. But this process takes time, and the shape of the foam is not immediately stable. In order to control the dimensions of the foam, it is passed through a calibration system, by drawing it by a motor at the end of the extrusion line. The calibrators, possibly temperature-controlled calibrators for more efficient control of the shape, especially at the beginning when the foam is the hottest, gradually impose to the foamed mass, its definitive shape.

1.8. In-Line Co-Extrusion (Optional):

It is possible to alter a portion or all the surface of the solidified primary foam profile by adding by co-extrusion an additional layer of material thereto. This secondary layer, which should compatible with the first in order to provide good cohesion, may have the function of reinforcing the mechanical properties, a decorative effect, the secondary layer may be compact or foamed.

1.9. In-Line Ornamentation (Optional):

It is possible to print decorative patterns on a selected portion of the profile, for example via a heating roll pressed against the locally preheated foam, or by a press system advancing with the profile, or any other method known to one skilled in the art.

1.10. Drawing and Cutting Operation:

The foam is therefore drawn by a simple or dual powered drawing machine according to the number of profiles extruded in parallel. The profile is then cut to length by a saw, providing a really perpendicular cut.

1.11. Off-Line Ornamentation (Optional):

It is possible to print decorative patterns on a selected portion of the cut-out profile, for example via a heating roll pressed against the locally preheated foam, or by a press system advancing with the profile, or any other method to one skilled in the art.

2. Raw Materials

2.1. Polymers:

Polystyrene is used as a base resin. The viscosity of the polystyrene will be adapted according to the foam profile, to the pressure required for obtaining good quality, to the desirable extrusion throughput. Several kinds of polystyrenes, differing in viscosity and therefore in molecular weight, with flow indexes ("Melt Flow Rate" MFR), from 1 to 25 g/10 minutes, according to ASTM D1238, measured at 200° C. and with a load of 5.0 kg, may be used alone or as a mixture. Copolymers of styrene and a diene monomer, which have a better impact strength and better elasticity, may also be added. For example: suitable acrylonitrile-butadiene-styrene (ABS), styrene-butadiene-styrene (SBS), styrene-ethylene-butadiene-styrene (SEBS), also having variable flow indexes ("Melt Flow Rate" MFR), according to the foam to be obtained.

Recycled material, compatible with all the components, for example scraps of foamed profiles, milled, degassed, and densified beforehand may also be added.

In the case of a co-extruded layer on the base foam, the materials are selected according to whether they are able to form a sufficiently cohesive bond with the base foam. These may be thermoplastics, thermosetting materials.

2.2. Gas:

The gas used is preferably $CO_2$, stored in a pressurized tank and at a temperature such that it is in the liquid state. By no means should 31.1° C. be exceeded, beyond this temperature, $CO_2$ becomes supercritical and therefore has a significantly lower density than the liquid, which makes its pumping delicate. The $CO_2$ is pumped in conduits cooled to significantly below the critical temperature, in order to maintain the liquid state up to the device for controlling the injection flow rate. This is a flowmeter operating according to the Coriolis effect, which allows the mass of the dosed gas per unit time to be linked to a difference in vibration velocity induced by the passage of the fluid in a vibrating conduit. As this flowmeter only works for liquids, it is therefore essential that the $CO_2$ remains in this state. The liquid $CO_2$ is then brought into the cylinder of the extruder via in injection port provided with a non-return valve.

2.3. Additives:

a. Nucleating Agent:

The cells of the foam are regularized by using a compound which will promote homogeneous distribution of the cells in the foam. These may be passive products, which do not react chemically, such as talc, calcium carbonate, silica, . . . . So-called "active" products may also be used which will decompose under the action of heat by giving off a gas phase. The reaction promotes homogeneous nucleation, as well as the presence of domains of finely divided gas. The combinations of citric acid and sodium bicarbonate, azodicarbonamide, and OBSH are well known.

b. Additives Assisting the Process:

These are compounds facilitating extrusion of the polystyrene mixture, by an internal or external lubrication effect. This is generally a molecule having a low molecular weight. Among the known products, let us mention esters of C4-C20 mono-alcohols, fatty acid amides, polyethylene waxes, oxidized polyethylene waxes, styrene waxes, C1-04 alcohols, siliconized compounds, etc.

These compounds may either be added to the mixture as soon as it enters the extruder, either as a master polystyrene-based mixture, or injected as a liquid into the extruder, or even injected with regularity and accuracy at the suitable location of the extrusion tool via a distributor ring, in order to exclusively and regularly line the flow channel of the die so as to form a film with a very low friction coefficient.

c. Pigments:

The foam mass may be uniformly colored by using pigments added to the feeder of the extruder. It is also possible to obtain a "wood effect" by using associations of color pigments with very different viscosities, for example combining a bright colored master mixture based on a high viscosity polymer with a dark colored master mixture based on a low viscosity polymer.

d. Other Additives:

Let us further mention unexhaustively:
- Fire retardants, either halogenated [chlorinated, brominated, fluorinated, . . . ] or not [hydroxides, phosphates, expansible graphite, . . . ];
- UV stabilizers;
- Antioxidants;
- Various mineral fillers;
- Strengthening fibers (glass, cellulose, . . . )
- Additives acting on the melt viscosity (high molecular weight acrylic copolymers)

3. Exemplary Embodiments

The following examples illustrate the conditions for obtaining the representative foams of the invention and their morphological aspects. The key extrusion parameters, the dimension of the profiles and the extracted amount of heat during cooling, are grouped in a table.

The polymer used is a crystalline polystyrene, MFI=15. A nucleating agent of the citric acid+sodium bicarbonate type was added in order to control the size of the cells. The foaming gas is 100% $CO_2$.

When a heat exchanger is used (Examples Nos. 1 to 5), the extracted amount of heat is calculated in order to reach the optimum die temperature. In the absence of an exchanger (Example No. 6), with no access to the temperature of the mass in the cylinder before the cooling section, it is not possible to evaluate this amount of heat. However, the optimum extrusion temperature is indicated.

ciently adaptive and flexible so that foams with a regular and fine cell structure may be obtained.

The foam emanating from the die has a smooth skin. The smooth skin is indicative of the fact that foaming takes place outside of the die. If the foaming took place in the die, then the pores at the surface would rupture because of contact between the die surface and the foam. This would lead to the formation of a rough foam surface.

What is claimed is:

1. A method for producing solid, hollow or open profiles, based on polystyrene, comprising:
    dosing polymers comprising polystyrene,
    plasticizing the components in an extruder in order to obtain a homogenous mixture,
    injecting a pressurized gas via an injection port in an amount from 0.2 to 0.4% by weight based on the polymers comprising polystyrene,
    kneading and pressurizing said homogeneous mixture and gas until complete dissolution of the gas in order to obtain a mixture in a single phase,
    gradually cooling said mixture while maintaining the pressure required for solubilizing the gas, to a temperature above 135° C.,
    having said mixture in a single phase, pass from a die into ambient conditions to form a foam, where the mixture passes onto the die at a rate of 50 to 120 kilograms of polystyrene per hour; and where the pressure at the shaping tool is 3 MPa to 7 MPa; and
    drawing the foam with a motor to produce a calibrated foam having a density of 290 to 350 kilograms per cubic meter and having a cell size of 25 to 100 micrometers.

2. The method according to claim 1, wherein the gradual cooling is controlled so as to provide a homogeneous temperature profile in a cross-section perpendicular to the flow, until the optimum foaming temperature is obtained.

3. The method according to claim 1, wherein the polymer is selected from the group consisting of polystyrene, acrylonitrile-butadiene-styrene (ABS), styrene-butadiene-styrene (SBS), styrene-ethylene-butadiene-styrene (SEBS) and mixtures thereof.

|  |  | Example No. ||||||
|---|---|---|---|---|---|---|---|
|  |  | 1 | 2 | 3 | 4 | 5 | 6 |
| Dimensions W × I | mm × mm | 120 * 15 | 40 * 20 | 38 * 16 | 150 * 17 | 19 * 12 | 40 * 20 |
| Current volume/meter | dm³/m | 1.26 | 0.42 | 0.39 | 2.23 | 0.2 | 0.42 |
| Density | kg/m³ | 344 | 311 | 295 | 343.6 | 308.2 | 297 |
| Exchanger? |  | YES | YES | YES | YES | YES | NO |
| PS mass flow rate | kg PS/h | 120 | 90 | 80 | 130 | 50 | 80 |
| $CO_2$ mass flow rate | g $CO_2$/min | 4.8 | 4.6 | 4.1 | 5 | 2.9 | 4.3 |
| $CO_2$ concentration | weight % | 0.2 | 0.3 | 0.3 | 0.2 | 0.4 | 0.3 |
| Exchanger inlet T° | ° C. | 192 | 189 | 188 | 193 | 184 | — |
| Die T° | ° C. | 154.8 | 157.4 | 163.5 | 156.9 | 161.6 | 159.5 |
| DELTA T° |  | 37.2 | 31.6 | 24.5 | 36.1 | 22.4 | — |
| Cooling power | kJ/h | 8225.87 | 5242.82 | 3613.21 | 8647.36 | 2065.20 | — |

It is seen that the amounts of heat are logical according to the densities, dimensions and extrusion rates. Examples 2 and 3 however illustrate that the optimum extrusion temperatures at the die also are a function of the complexity of the shapes: in spite of their similar volumes, the shape of Example 3 is much more tortuous than that of Example 2, increasing frictions, but the method in each case is suffi- 4. The method according to claim 1, wherein several kinds of polystyrenes which differ in viscosity, are used either alone or mixed with other copolymers of styrene and a diene monomer.

5. The method according to claim 1, wherein a portion or the whole of the surface of the profile is altered by adding by co-extrusion an additional layer of material thereto.

6. The method according to claim 5, wherein the co extruded material is in the foamed or compact state.

7. The method according to claim 1, wherein the gas used is CO2.

8. The method according to claim 1, wherein compounds facilitating extrusion of the polystyrene mixture, selected from the group consisting of esters of C4-C20 mono-alcohols, fatty acid amides, polyethylene waxes, oxidized polyethylene waxes, styrene waxes, C1-C4 alcohols, siliconized compounds and mixtures thereof, are added.

9. The method according to claim 8, wherein the compounds facilitating extrusion of the polystyrene mixture are injected with regularity and accuracy at a suitable location of the shaping tool via a distributor ring, in order to exclusively and regularly line the flow channel of the die.

10. The method according to claim 1, wherein the dosing comprises adding additives and adjuvants to the polymers.

11. The method according to claim 1, wherein the calibrated foam is produced by a calibration system; wherein the calibration system is temperature-controlled.

12. A method for producing solid, hollow or open profiles, the method comprising:

dosing a polymer including polystyrene;

plasticizing the polymer including the polystyrene in an extruder to obtain a homogenous mixture;

injecting a pressurized gas into the extruder in an amount from 0.2 to 0.4% by weight of the homogenous mixture;

kneading and pressurizing said homogeneous mixture and gas until dissolution of the gas to obtain a mixture in a single phase;

cooling the mixture to a temperature in excess of 135° C. while maintaining the pressure required for solubilizing the gas;

passing the mixture from a die at a rate of 50 to 120 kilograms of polystyrene per hour; to form a foam; where the foaming occurs outside the die and where the pressure at the die is 3 MPa to 7 MPa pounds per square inch;

and drawing the foam with a motor to produce a calibrated foam having a density of 290 to 350 kilograms per cubic meter and having a cell size of 25 to 100 micrometers.

* * * * *